US008707101B2

(12) United States Patent
Almog et al.

(10) Patent No.: US 8,707,101 B2
(45) Date of Patent: Apr. 22, 2014

(54) VERIFICATION OF OPERATING SELF MODIFYING CODE

(75) Inventors: Eli Almog, Poughkeepsie (IL); Oz Dov Hershkovitz, Haifa (IL); Christopher Krygowski, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 12/942,036

(22) Filed: Nov. 9, 2010

(65) Prior Publication Data

US 2012/0117427 A1    May 10, 2012

(51) Int. Cl.
*G06F 11/00* (2006.01)
(52) U.S. Cl.
USPC .................................. 714/33; 714/25; 714/42
(58) Field of Classification Search
USPC .................. 714/44, 33, 25, 6.1, 42
See application file for complete search history.

(56) References Cited

U.S. PATENT DOCUMENTS

| 4,819,234 | A  | * | 4/1989  | Huber .......................... 717/129 |
| 6,195,616 | B1 | * | 2/2001  | Reed et al. .................... 702/119 |
| 6,336,212 | B1 | * | 1/2002  | Gray et al. .................... 717/124 |
| 7,185,321 | B1 | * | 2/2007  | Roe et al. ...................... 717/134 |
| 2003/0065976 | A1 | * | 4/2003  | Bennett et al. .................. 714/35 |
| 2005/0278576 | A1 | * | 12/2005 | Hekmatpour .................... 714/37 |
| 2008/0270775 | A1 | * | 10/2008 | Lundvall et al. .............. 712/244 |
| 2009/0024876 | A1 | * | 1/2009  | Arora et al. .................... 714/42 |
| 2009/0150430 | A1 | * | 6/2009  | Foti .......................... 707/103 R |
| 2009/0265534 | A1 |   | 10/2009 | Averill et al. |

* cited by examiner

*Primary Examiner* — Sarai Butler
(74) *Attorney, Agent, or Firm* — Ziv Glazberg

(57) ABSTRACT

Verification of a system-under-test (SUT) supporting the functionality of operating a self modifying code is disclosed. A generator may generate a self modifying code. In response to identification that a simulator is about to simulate code generated by the self modifying code, the simulator may simulate the execution in a "rollover mode". The code may include instruction codes having variable byte size, branching instructions, loops or the like. The simulator may further simulate execution of an invalid instruction. The simulator may perform rollback the simulation of the rollover mode in certain cases and avoid entering the rollover mode. The simulator may perform rollback in response to identifying a termination condition, as to insure avoiding endless loops. The simulator may perform rollback in response to reading an initialized value that is indefinite.

25 Claims, 3 Drawing Sheets

VERIFICATION OF OPERATING SELF MODIFYING CODE

BACKGROUND

The present disclosure relates to functional verification in general, and to generation and simulation of self modifying code, in particular.

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

Functional verification is one method that may be employed to increase quality of the computerized device. Functional verification tries to check that the design of the computerized device is in accordance with requirements. One method of performing functional verification is by generating stimuli and injecting the stimuli to a simulation of the computerized device. Generation may be biased towards stimuli of a relatively high quality. Generation may be based on a test template, which comprises a definition of the various characteristic that the stimuli should have. The test template may be provided in a context-free formal language. The simulator may simulate execution of the computerized device based on a descriptive language describing the device, such as for example an Hardware Descriptive Language (HDL), SystemC, Verilog or the like. In some exemplary embodiments, online generators employ generation-simulation cycles, in which one or more instructions are generated and execution thereof is simulated. Based on the state of a reference model (i.e., the simulated state of the computerized device), successive instructions may be generated in the next cycle. In some exemplary embodiments, offline generators generate a complete test based on the test template, and thereafter a simulator is utilized to simulate the execution thereof. In an offline generator, the generation is not affected by the simulation process.

A System-Under-Test (SUT), such as a processor, an accelerator, or a similar processing device, may be capable of handling Self Modifying Code (SMC). An SMC is a set of instructions (e.g., a program) that, once loaded onto the SUT, may cause the SUT to modify the program by adding, deleting, modifying the set of instructions. In some exemplary embodiments, the SMC may determine a new instruction and add to the instruction

SUMMARY

One exemplary embodiment of the disclosed subject matter is a computerized apparatus having a processor and a storage device, the apparatus comprising: a generator configured to generate and store instructions associated with a system-under-test (SUT), wherein said generator is configured to generate self modifying code; a simulator configured to simulate an execution of an instruction by the SUT, wherein said simulator is operatively coupled to: a rollover mode detector configured to determine whether the simulator is about to simulate an execution of a code that is generated by the self modifying code; and a code interpreter configured to interpret the code.

Another exemplary embodiment of the disclosed subject matter is a computer-implemented method, the method is performed by a processor, the method comprising: performing simulation-generation cycles, wherein each cycle comprises: generating one or more instructions associated with a system-under-test (SUT); simulating execution of the one or more instructions by the SUT; wherein in respect to a cycle of the cycles, said generation comprises generation of a self modifying code; identifying a rollover mode, wherein the rollover mode is identified in response to a determination that an code that is about to be simulated was generated by the self modifying code; and simulating execution of the code by the SUT.

Yet another exemplary embodiment of the disclosed subject matter is a computer program product, the product comprising: a non-transitory computer readable medium; a first program instruction for performing simulation-generation cycles, wherein each cycle comprises: generating one or more instructions associated with a system-under-test (SUT); simulating execution of the one or more instructions by the SUT; wherein in respect to a cycle of the cycles, the generation comprises generation of a self modifying code; a second program instruction for identifying a rollover mode, wherein the rollover mode is identified in response to a determination that an code that is about to be simulated was generated by the self modifying code; a third program instruction for simulating execution of the code by the SUT; and wherein said first, second and third program instructions are stored on said computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
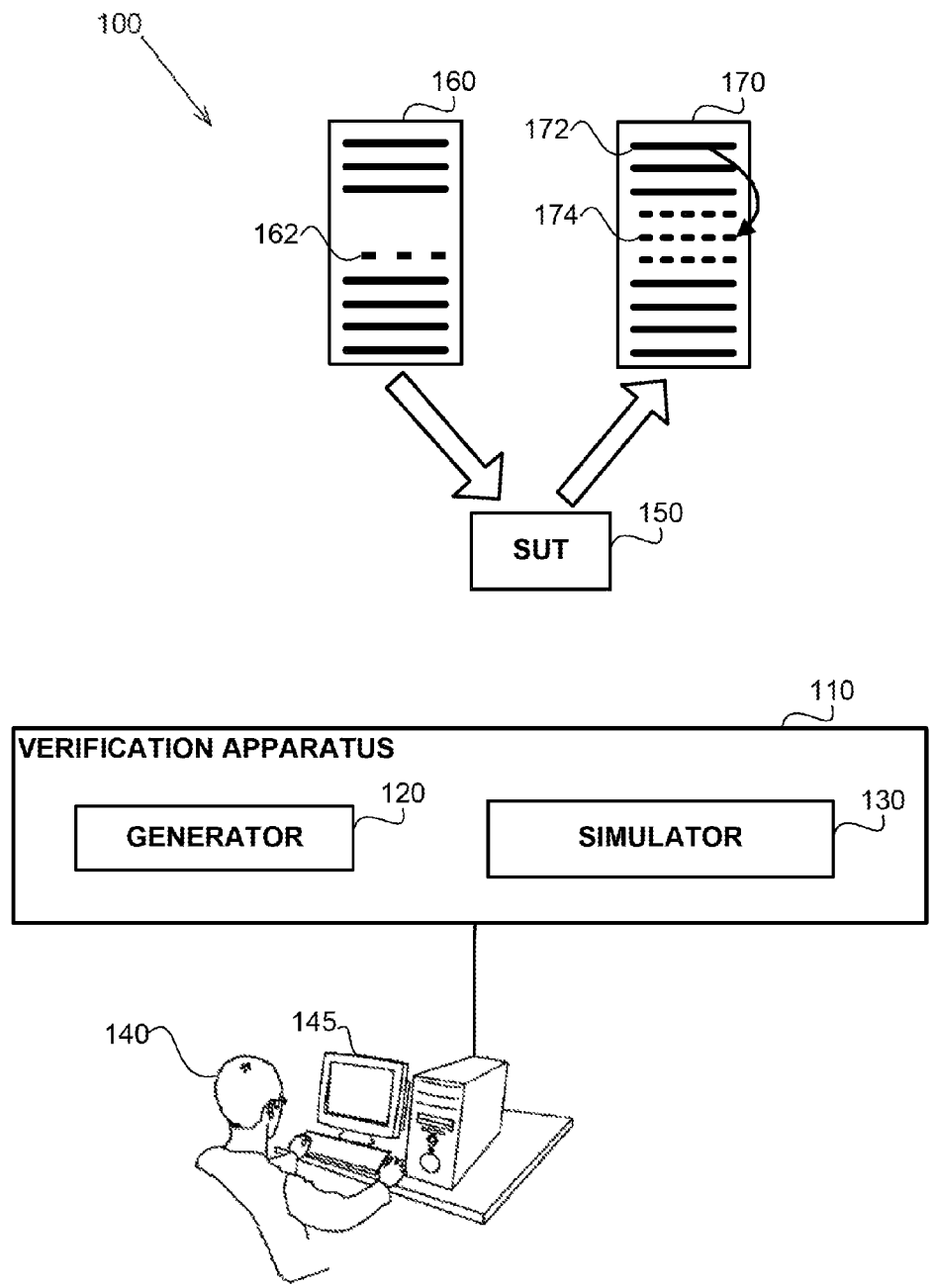
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to provide for a functional verification of an SUT, capable of handling with SMC. The SMC may be operative to generate code during its execution. For the convenience of the reader, the code may be referred to as "generated code", as opposed to the code that generated the generated code which may be referred to as "SMC". Another technical problem is to verify correctness of handling the SMC. The SMC may generate branching instructions, conditional jumps instructions, and the like. Yet another technical problem is to handle with possible endless loops that the SMC may generate. Yet another technical problem is to simulate operation of the SUT when performing an invalid instruction generated by the SMC. Yet another technical problem is to handle SMC that initializes only a portion of the bits associated with an instruction.

One technical solution is to detect rollover mode and postpone generation of next instructions until simulated execution of the code generated by the SMC is completed. Another technical solution is to enable rollback in response to a determination that an error occurred during the rollover mode. Rollback may include revoking operations during the rollover mode and generating an escape sequence associated with avoiding execution of the generated code. Rollback may be invoked in response to a suspicion that an endless loop was encountered, in response to an identification of an indefinite value in the generated code. Rollback may be invoked in additional scenarios. Yet another technical solution is to randomize uninitialized bits in memory in response to reading the bits during the rollover mode. Yet another technical solution is to interpret the code read from memory and to simulate its execution. Interpreting the code may be performed using a disassembler. Yet another solution is to generate synchronization code or similar pre-executing generated code in response to identification that succeeding instructions are generated code.

One technical effect of utilizing the disclosed subject matter is to provide a better verification process of the SUT. Another technical effect is to stimulate and simulate portions of the SUT associated with operating SMC. Yet another technical effect is to randomly generate SMC and simulate execution thereof. The generated SMC may generate both invalid and valid instructions, may generate branching instructions, may create loops or the like.

Referring now to FIG. 1 showing a computerized environment in which the disclosed subject matter is used, in accordance with some exemplary embodiments of the subject matter.

A computerized environment 100 may comprise an SUT 150. The SUT 150 may be a computerized device configured to execute a program code of some sort. The SUT 150 may be a Central Processing Unit (CPU), an Integrated Circuit (IC), a general-purpose processor, a special-purpose processor (also referred to as an accelerator), or the like. The SUT 150 may be comprised of hardware components, software components, firmware component, combination thereof, or the like.

In some exemplary embodiments, an original code 160 may be a SMC. The original code 160 may be operative to cause the SUT 150 to modify the code and produce a modified code 170. In some exemplary embodiments, the modified code 170 may be retained in a memory of the SUT 150 or in a similar storage device. A pertinent portion of the memory of the SUT 150 may be initialized by the original code 160, and during the execution the pertinent portion of the memory may retain the modified code 170. In some exemplary embodiments, an instruction 172 may cause the SUT 150 to generate a generated instruction 174. In some exemplary embodiments, an instruction 162 from the original code 160 may be overwritten. In some exemplary embodiments, generated code may be added to the original code 160 without overwriting original instructions.

A verification apparatus 110 may be configured to verify functional correctness of the SUT 150. The verification apparatus 110 may be utilized without having access to the SUT 150 itself, but rather to a description thereof, such as provided using HDL, SystemC, Verilog, or the like. The verification apparatus 110 may be configured to generate stimuli by a generator 120 and simulate execution thereof by a simulator 130. The generated stimuli may be instructions associated with the SUT 150, such as for example assembler instructions of the SUT 150.

In some exemplary embodiments, the simulator 130 may utilize a functional definition of the SUT 150 to simulate execution thereof. In some exemplary embodiments, an HDL simulator 130 may be utilized. The simulator may provide for a reference model of the SUT 150. The reference model may keep track of the content of the memory of the SUT 150 (e.g., values of registers, value of an instruction pointer, program space, heap, stack, or the like). In some exemplary embodiments, a simulated instruction pointer may point to the next memory address from which the next instruction is read. In some exemplary embodiments, the generator 120 may generate an instruction and store the instruction in the next memory address.

In some exemplary embodiments, the generator 120 may generate instructions based on a test template. In some exemplary embodiments, a test template may be associated with the SUT 150 and describe, in a general manner, stimuli to be generated and used to test the SUT 150. The test template may be provided in a predetermined formal language. The test template may be hand-written by a user 140, such as a specification engineer, a verification engineer, a QA staff member, a developer or the like.

In some exemplary embodiments, the user 140 may interact with the verification apparatus 110 using a Man-Machine Interface (MMI) 145 such as a terminal, a display, a keyboard, an input device or the like. The user 140 may define the test template such as by writing a text file containing the test template. The user 140 may provide the definition of the SUT 150 (e.g., HDL file). The user 140 may provide rules, commands, preferences, and parameters to the generator 120. The user 140 may provide rules, commands, preferences, and parameters to the simulator 130. The user 140 may view the code generated by the generator 120. The user 140 may view the simulated execution performed by the simulator 130 (e.g., by viewing a log file). Based upon the simulated execution by the simulator 130, the user 140 may determine to design a new test template, to modify the test template, to generate an additional test cases based on the original, new or modified test template or the like. The user 140 may further identify bugs, report the identified bugs and/or correct the identified bugs.

Figure 2:
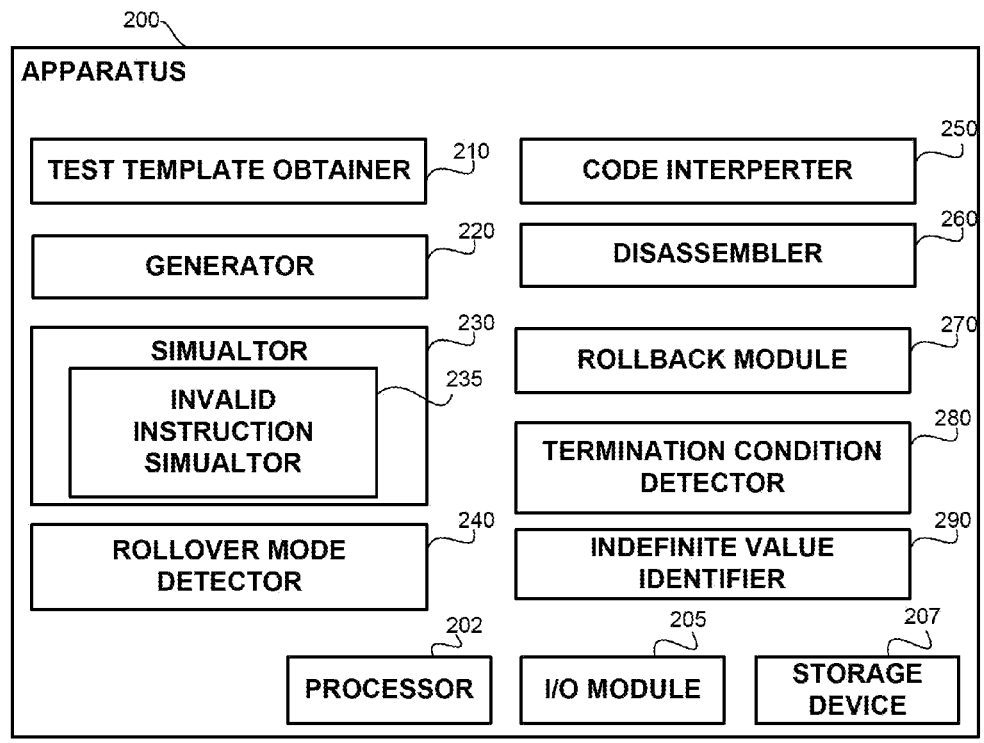
FIG. 2 shows a block diagram of an apparatus, in accordance with some exemplary embodiments of the disclosed subject matter.

Referring now to FIG. 2 showing an apparatus in accordance with some exemplary embodiments of the disclosed subject matter. An apparatus 200, such as 110 of FIG. 1, may be configured to test the functional operation of an SUT, such as 150 of FIG. 1.

In some exemplary embodiments, a test template obtainer 210 may be configured to retrieve, receive, or otherwise obtain a test template, such as a 120 of FIG. 1. In some exemplary embodiments, the test template obtainer 210 may utilize an I/O module 205 to obtain the test template.

In some exemplary embodiments, a generator 220, such as 120 of FIG. 1, may be configured to generate one or more instructions based on the test template. In response to generating the instructions, a simulator 230 may simulate execution thereof. In response to the simulation, the generator 220 may generate additional instructions and store them in a next memory address. And so forth. In some exemplary embodiments, the generator 220 is configured to generate an SMC. The SMC is operative, when executed by the SUT, to generate a generated code and to cause the SUT to execute the generated code. The generated code may comprise a control flow instruction such as a branching instruction, a conditional jump instruction, an unconditional jump instruction, or the like. The control flow instruction may create a loop, which may be potentially an endless loop.

In some exemplary embodiments, a simulator 230, such as 130 of FIG. 1, may be operative to simulate an execution of instructions by the SUT. The simulator 230 may keep track of a state of the SUT, including the state of the instruction pointer.

In some exemplary embodiments, an invalid instruction simulator 235 may be operative to simulate execution of an invalid instruction by the SUT. For example, the invalid instruction simulator 235 may raise an interrupt, throw an exception, or perform similar operation. In some exemplary embodiments, the simulator 230 may comprise the invalid instruction simulator 235. In other exemplary embodiments, the simulator 230 may utilize a separate invalid instruction simulator 235. In some exemplary embodiments, the functionality of handling invalid instructions may be defined in the definition of the SUT. In some exemplary embodiments, the SMC may be operative to generate a generated code that may comprise an invalid instruction. The invalid instruction simulator 235 may be utilized to correctly handle the generated code in this case.

In some exemplary embodiments, a rollover mode detector 240 may be configured to detect that the apparatus 200 is about to enter into "rollover mode". The "rollover mode" is a mode in which the apparatus 200 does not generate additional instructions using the generator 220 but rather simulates execution of generated code by the simulator 230, until some condition occurs. Rollover mode may be detected based on the value of the simulated instruction pointer. In case the simulated instruction pointer points to an address comprising generated code that was generated by the SMC, rollover mode may be detected. In some exemplary embodiments, a determination that the simulated instruction pointer points to a memory address comprising initialized values or partially initialized value may indicate that rollover mode may commence. In some exemplary embodiments, rollover mode may commence if the simulated instruction pointer is in the vicinity of an address comprising the generated code. For example, in case the simulated instruction pointer is located six bytes prior to the address. In some exemplary embodiments, the definition of "vicinity" may be affected by a design requirement of the SUT to perform synchronization code, cache flush instructions, or similar pre-executing generated code prior to operating the generated code. In some exemplary embodiments, the definition of "vicinity" may be affected by an expected size, an average size, a maximal size or the like of a generated instruction. A detection of a rollover mode may be performed in case a newly generated instruction may overwrite, at least partially, the generated code. The size of the newly generated instruction may therefore be of relevance.

In some exemplary embodiments, a code interpreter 250 may be configured to interpret the code from memory prior to execution of generated code. In some exemplary embodiments, the code interpreter 250 may read from the memory location pointed to by the simulated instruction pointer and randomize uninitialized bits, bytes or similar storage units. In some exemplary embodiments, machine codes of instructions may have variable sizes. For example, a first instruction machine code may be comprised of two bytes, while a second instruction machine code may be comprised of five bytes. In some exemplary embodiments, the code interpreter 250 may read from memory block by block. The code interpreter 250 may cumulate the blocks until the cumulated blocks identify an instruction or until a maximum bound on instruction length is reached. In case no valid instruction is identified, simulation may be performed by the invalid instruction simulator 235.

In some exemplary embodiments, the code interpreter 250 may utilize a disassembler 260. The disassembler 260 may be utilized to identify an instruction based on machine code. The disassembler 260 may be utilized to identify whether cumulated blocks identify an instruction. The disassembler 260 may be a generic disassembler, a third-party disassembler that may be invoked using, for example, an Application Programming Interface (API). The disassembler 260 may provide an instruction mnemonic in case the data corresponds to a valid instruction. In some exemplary embodiments, in case the code interpreter 250 determines a valid instruction mnemonic, the simulator 230 may be utilized to generate this instruction mnemonic, initialize necessary memory and registers, and create a required translation path.

In some exemplary embodiments, a rollback module may be configured to undue simulated execution of the generated code. In some exemplary embodiments, prior to commencing rollover mode, a state of the reference model may be stored, and in case rollback is initiated, the state may be restored. In some exemplary embodiments, in similar manner to that of database processing, modifications during the rollover mode may not be committed, and revoking the modifications may be performed by dropping the modifications. In some exemplary embodiments, the rollback may be performed such as to rollback generation of the last instruction generated by the generator 220 before the rollover mode. In some exemplary embodiments, in order for operation to be different after rollback is performed, an escape sequence may be generated. The escape sequence may comprise one or more instructions operative to direct the control flow away from the generated code. For example, an escape sequence may be an unconditional jump instruction to an uninitialized memory location.

In some exemplary embodiments, rollback may be initiated in response to predetermined conditions. Two exemplary conditions are disclosed. However, the disclosed subject matter is not limited to these examples. A person of ordinary skill in the art would recognize additional possible conditions that may require the invocation of a rollback, in accordance with the disclosed subject matter.

In some exemplary embodiments, a termination condition detector 280 may be configured to detect a predetermined termination condition. The predetermined termination condition may be a condition that, when occurs, there is a possibility that an infinite loop is being performed. In some exemplary embodiments, the predetermined termination condition may be a threshold number of instructions performed during the rollover mode (e.g., fifty instructions). In some exemplary embodiments, the predetermined termination condition may be performing a control flow instruction which directs the instruction pointer to a memory address that was previously executed during the rollover mode. In some exemplary embodiments, looping may be allowed, but a threshold on the number of repetitions may be enforced. Additional or alternative termination conditions may be utilized. In some exemplary embodiments, in response to detection by the termination condition detector 280, the rollback module 270 may be invoked.

In some exemplary embodiments, an indefinite value identifier 290 may be utilized to determine whether a block read by the code interpreter 250 is initialized and indefinite. In modern processors, concurrent operation of different processing entities may result in values being initialized with a non-unique value. For example, generating true-sharing Store-Store collision may result in a shared memory becoming unpredictable, and therefore, causing non-unique predicted results. In such a case, the shared memory may be said to be initialized with a non-unique value. As another example, in uni-processor generation, some exceptions may leave memory addresses with unpredictable, and therefore non-unique, values. The apparatus 200 may handle a situation in which the read value is indefinite by performing a rollback using the rollback module 270.

In some exemplary embodiments, the apparatus 200 may comprise a processor 202. The processor 202 may be a Central Processing Unit (CPU), a microprocessor, an electronic circuit, an Integrated Circuit (IC) or the like. The processor 202 may be utilized to perform computations required by the apparatus 200 or any of it subcomponents.

In some exemplary embodiments of the disclosed subject matter, the apparatus 200 may comprise an Input/Output (I/O) module 205. The I/O module 205 may be utilized to provide an output to and receive input from a user, such as 140 of FIG. 1.

In some exemplary embodiments, the apparatus 200 may comprise a storage device 207. The storage device 207 may be a hard disk drive, a Flash disk, a Random Access Memory (ROM), a memory chip, or the like. In some exemplary embodiments, the storage device 207 may retain program code operative to cause the processor 202 to perform acts associated with any of the subcomponents of the apparatus 200. The storage device 207 may retain a test template obtained by the test template obtainer 210. The storage device 207 may retain a state of the reference model simulated by the simulator 230, or the like.

Figure 3:
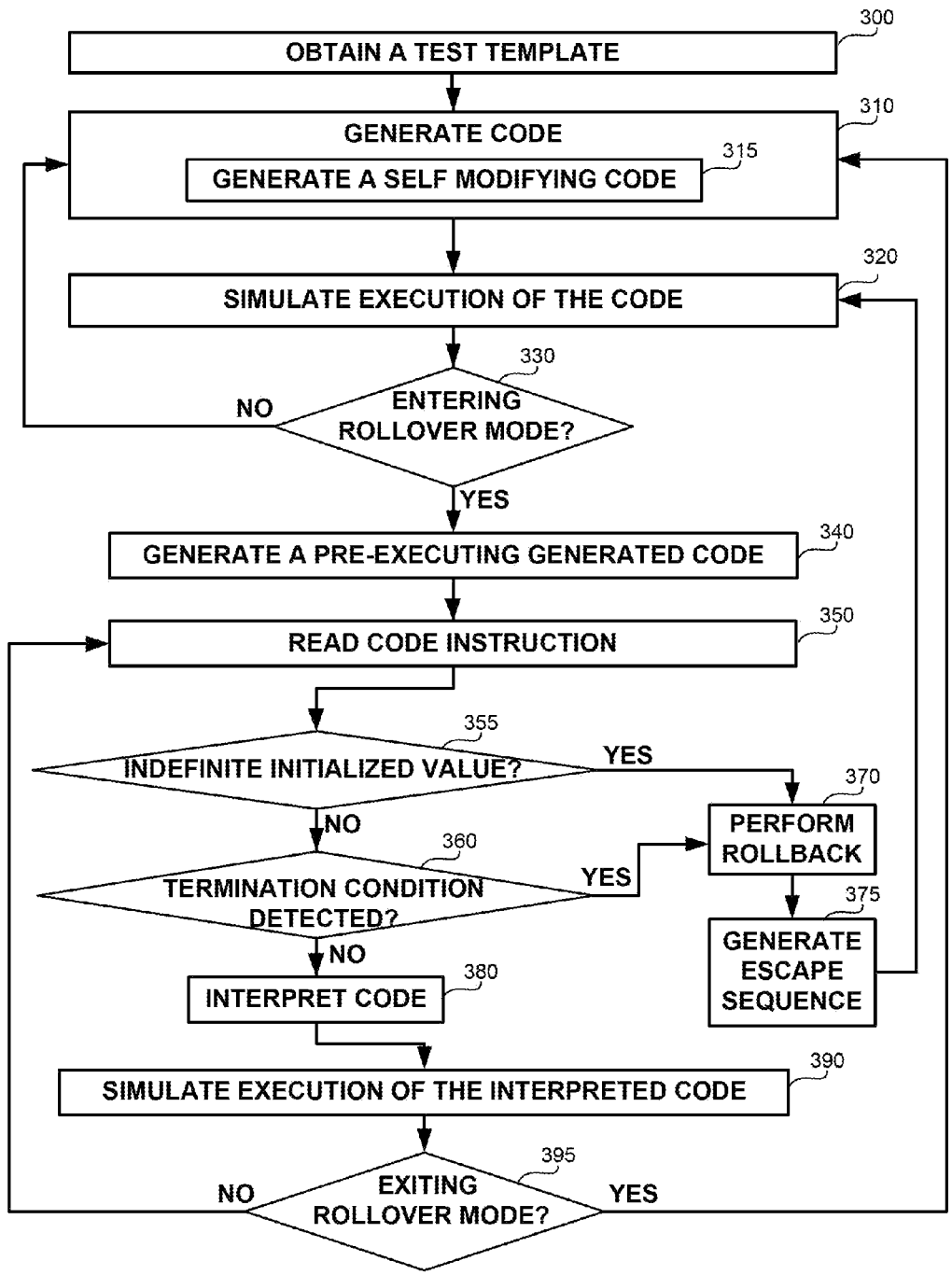
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, a test template may be obtained. The test template may be obtained by a test template obtainer, such as 210 of FIG. 2.

In step 310, code may be generated. The code may be generated by a generator, such as 220 of FIG. 2. In some exemplary embodiments, the generated code may be a Self Modifying Code (SMC), as is depicted in step 315. In some exemplary embodiments, step 310 may be performed several times. In some of the times, SMC may be generated, while in others, "regular", non-SMC, instructions may be generated.

In step 320, execution of the generated code may be simulated. The simulation may be performed by a simulator, such as 230 of FIG. 2.

In some exemplary embodiments, steps 310 and 320 may generally provide for a generation-simulation cycle.

In step 330 a determination whether rollover mode is entered may be performed. The determination may be performed by a rollover mode detector, such as 240 of FIG. 2. In case rollover mode is not performed, step 310 may be performed. Otherwise, steps 340-395 may be performed.

In step 340, pre-executing generated code may be generated. The pre-executing generated code may be generated in accordance with the design of the SUT. The pre-executing generated code may be generated by the rollover mode detector.

In step 350, a code instruction may be read. The code instruction may be read by a code interpreter, such as 250 of FIG. 2. The code instruction may be read block by block, e.g., byte by byte. In some exemplary embodiments, in case uninitialized bits/blocks are read, their value may be set to a random value.

In step 355, a detection of an initialized value that is indefinite is performed. The detection may be performed by an indefinite value identifier, such as 290 of FIG. 2. In response to such detection, rollback may be performed.

In step 360, termination condition may be detected. The detection may be performed by a termination condition detector, such as 280 of FIG. 2. In response to such detection, rollback may be performed.

In step 380, in case rollback was not performed, the code read code instruction may be interpreted. The interpretation may be performed by a code interpreter, such as 250 of FIG. 2.

In step 390, simulation of the interpreted code may be performed. The simulation may be performed by a simulator, such as 230 of FIG. 2.

In case rollback is determined to be performed, step 370 may be performed. In step 370, rollback may be performed. Rollback may be performed by a rollback module, such as 270 of FIG. 2.

In step 375, an escape sequence may be generated. The escape sequence may be generated by the rollback module. In response to generating the escape sequence, step 320 may be performed to simulate execution of the escape sequence.

In step 395, a determination whether or not rollover mode is to be ended may be performed. The determination may be the same determination as whether or not to enter the rollover mode (e.g., simulated instruction pointer points to an initialized address, next instruction to be generated would overwrite an initialized memory location, or the like). In case, rollover mode continues, step 350 may be performed. In case rollover mode ends, step 310 may be performed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computerized apparatus having a processor and a storage device, the apparatus comprising:
    a generator configured to generate and store instructions associated with a system-under-test (SUT), wherein said generator is configured to generate self modifying code;
    a simulator configured to simulate an execution of an instruction by the SUT;
    wherein said generator and said simulator are configured to perform generation-simulation cycles, wherein each cycle comprises generation of one or more instructions and simulation of the one or more instructions; and
    a rollover mode detector configured to determine whether, during a generation-simulation cycle, the simulator is about to simulate an execution of a code that is generated by the self modifying code, wherein said simulator is configured to simulate the code in response to a determination by said rollover mode detector, whereby avoiding overwriting the code with a new generated instruction of a successive cycle to the generation-simulation cycle.

2. The computerized apparatus of claim 1, wherein said rollover mode detector is configured to determine, based on a simulated instruction pointer, that in case that said generator generates a next instruction, the code will be partially overwritten; and wherein said simulator is configured to simulate the simulated instruction pointer.

3. The computerized apparatus of claim 1, wherein said generator and said simulator are configured to perform generation-simulation cycles.

4. The computerized apparatus of claim 1, wherein said code interpreter utilizes a disassembler.

5. The computerized apparatus of claim 1, further comprising a rollback module configured to undue simulation during rollover mode, wherein said rollback module is further operative to generate an escape sequence operative to avoid simulation of the code.

6. The computerized apparatus of claim 5, wherein said simulator is operatively coupled to a termination condition module configured to detect a predetermined termination condition; and wherein said rollback module is responsive to detection by said termination condition module.

7. The computerized apparatus of claim 5, wherein said code interpreter is operative to read the code from a memory; wherein said code interpreter is operatively coupled to an indefinite value identifier configured to determine that the read memory is initialized with an indefinite value; and wherein said rollback module is responsive to identification by said indefinite value identifier.

8. The computerized apparatus of claim 1, wherein the self modifying code is configured to at least generate a flow control instruction.

9. The computerized apparatus of claim 1, wherein said simulator is operatively coupled to an invalid instruction simulator configured to simulate an execution by the SUT of an invalid instruction.

10. The computerized apparatus of claim 1, wherein said code interpreter is operative to read the code from a memory, wherein said code interpreter is operative to interpret instruction codes having different number of readable blocks.

11. The computerized apparatus of claim 1, further comprising a test template obtainer operative to obtain a test template, and wherein said generator is configured to generate instructions based on the test template.

12. A computer-implemented method, the method is performed by a processor, the method comprising:
    performing generation-simulation cycles, wherein each cycle comprises:
        generating one or more instructions associated with a system-under-test (SUT);
        simulating execution of the one or more instructions by the SUT;
    wherein in respect to a cycle of the cycles, said generation comprises generation of a self modifying code, wherein in response to simulating the self modifying code, a code is generated;
    identifying a rollover mode, wherein the rollover mode is identified in response to a determination that the code is about to be simulated; and
    in response to identifying the rollover mode, simulating execution of the code by the SUT, whereby avoiding overwriting the code with a new generated instruction of a successive cycle to the cycle.

13. The method of claim 12, wherein said identifying the rollover mode comprises: determining, based on a simulated instruction pointer, that in case a next instruction is generated, the code will be partially overwritten.

14. The method of claim 12, wherein said simulating the execution of the code comprises interpreting the code using a disassembler.

15. The method of claim 12 further comprising performing a rollback, wherein performing the rollback comprises:
    revoking simulation performed during the rollover mode;
    generating an escape sequence operative to avoid simulating the code; and
    simulating execution of the escape sequence.

16. The method of claim 15, further comprising detecting, during said simulating execution of the code, a predetermined termination condition; and wherein in response to said detecting, performing the rollback.

17. The method of claim 15, wherein
    said simulating the execution of the code comprises reading the code from memory;
    the method further comprises determining that a read memory is initialized with an indefinite value; and
    wherein in response to said determining, performing the rollback.

18. The method of claim 12, wherein the code comprises a loop.

19. The method of claim 12, wherein said simulating execution of the code comprises: identifying an invalid instruction; and simulating an execution by the SUT of the invalid instruction.

20. The method of claim 12, wherein said simulating the execution of the code comprises reading a first instruction code and a second instruction code from a memory; wherein a first instruction code and the second instruction code having a different number of readable blocks.

21. The method of claim 12, further comprising obtaining a test template; and wherein said generating is performed based on the test template.

22. A computer program product, the product comprising:
    a non-transitory computer readable medium;
    a first program instruction for performing generation-simulation cycles, wherein each cycle comprises:
        generating one or more instructions associated with a system-under-test (SUT);
        simulating execution of the one or more instructions by the SUT;
    wherein in respect to a cycle of the cycles, the generation comprises generation of a self modifying code, wherein in response to simulating the self modifying code, a code is generated;
    a second program instruction for identifying a rollover mode, wherein the rollover mode is identified in response to a determination that the code is about to be simulated;
    a third program instruction for simulating, in response to identifying the rollover mode, execution of the code by the SUT, whereby avoiding overwriting the code with a new generated instruction of a successive cycle to the cycle; and
    wherein said first, second and third program instructions are stored on said computer readable medium.

23. The computer-program product of claim 22, further comprising a fourth program instruction for interpreting the code using a disassembler, wherein said fourth program instruction is invoked for the simulating.

24. The computer-program product of claim 22, further comprising a fourth program instruction for performing a rollback, wherein performing the rollback comprises:
    revoking simulation performed during the rollover mode;
    generating an escape sequence operative to avoid simulating the code; and
    simulating execution of the escape sequence.

25. The computer-program product of claim 22, wherein said simulating execution of the code comprises: identifying an invalid instruction; and simulating an execution by the SUT of the invalid instruction.

* * * * *